R. A. FESSENDEN.
AGRICULTURAL ENGINEERING.
APPLICATION FILED OCT. 6, 1906.

1,121,722.

Patented Dec. 22, 1914.
4 SHEETS—SHEET 1.

WITNESSES:

INVENTOR.

R. A. FESSENDEN.
AGRICULTURAL ENGINEERING.
APPLICATION FILED OCT. 6, 1906.

1,121,722.

Patented Dec. 22, 1914.
4 SHEETS—SHEET 2.

UNITED STATES PATENT OFFICE.

REGINALD A. FESSENDEN, OF WASHINGTON, DISTRICT OF COLUMBIA.

AGRICULTURAL ENGINEERING.

1,121,722. Specification of Letters Patent. Patented Dec. 22, 1914.

Application filed October 6, 1906. Serial No. 337,737.

*To all whom it may concern:*

Be it known that I, REGINALD A. FESSENDEN, a citizen of the United States, residing at Washington, in the District of Columbia, have invented certain new and useful Improvements in Agricultural Engineering, of which the following is a specification.

My invention relates generally to agriculture, and more specifically to apparatus for promoting and controlling plant growth by artificial means.

Broadly, the object of the invention is to more efficiently utilize solar energy with the effect, incidentally, of improving the condition of the agricultural classes in society.

More specifically, the immediate objects of the invention include the concentration of the acreage required for growing plants, the control of plant diseases and of the time and place of production, the improvement of plant life by eliminating weeds, and direct manipulation of soil conditions, light and humidity and in general the provision of what might be called an artificial climate suited to the particular plant and the selective development of plants.

Figure 1:
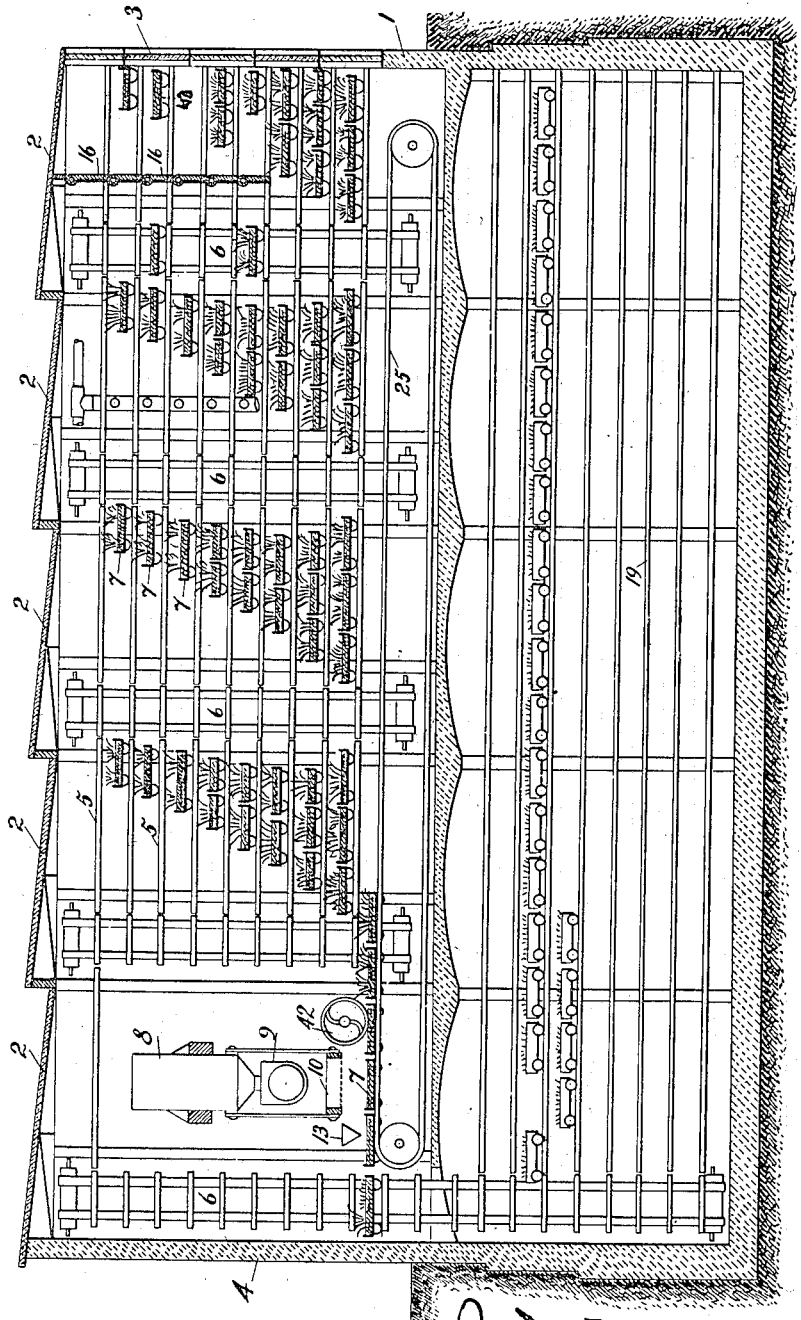
Figure 2:
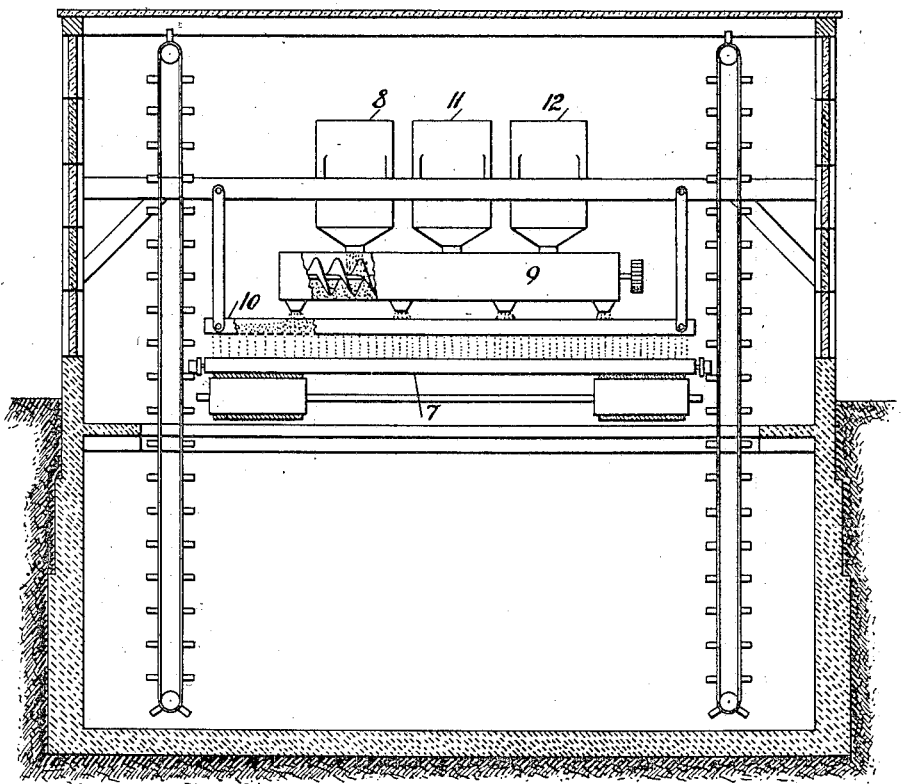
Figure 3:
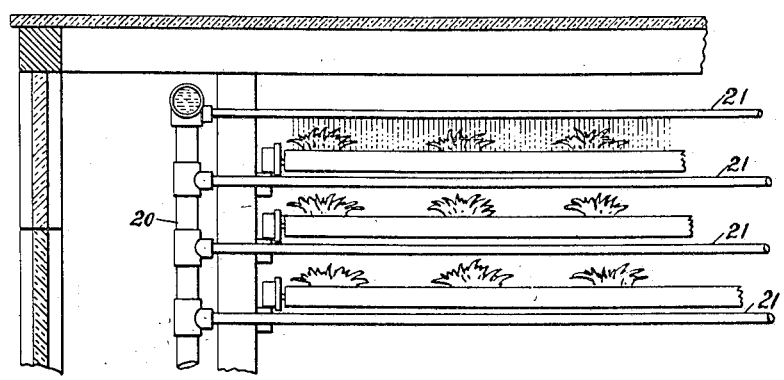
Figure 4:
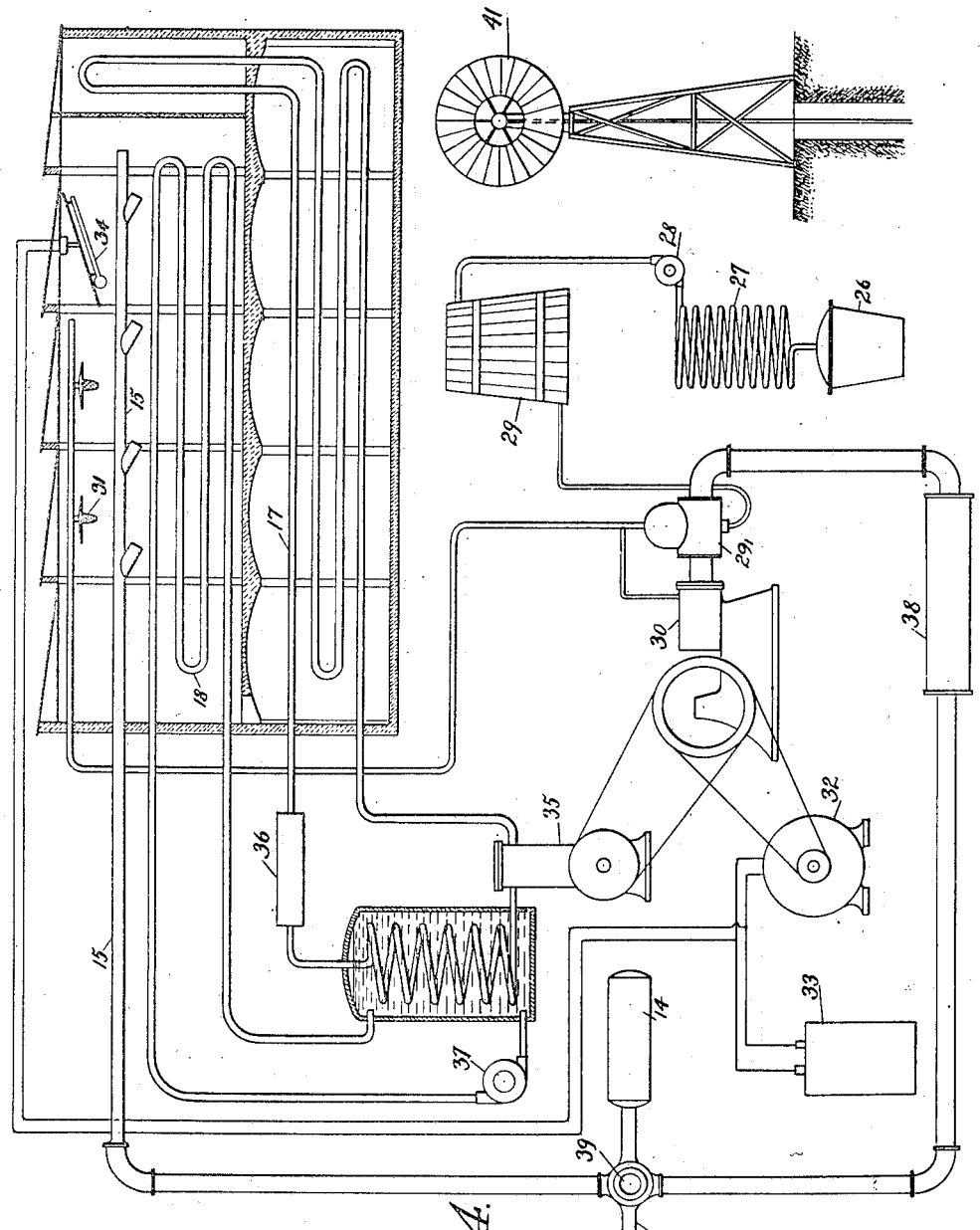
Figure 5:
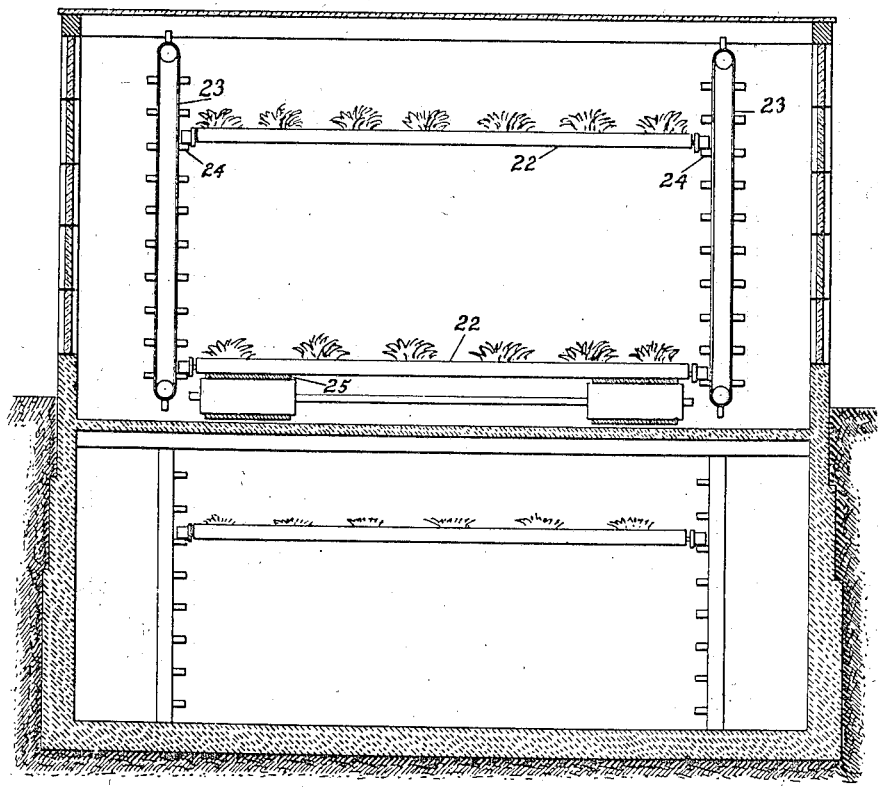

In the accompanying drawing I have illustrated an apparatus embodying my invention; Figure 1 showing a vertical section of a growing house; Fig. 2 a cross-section of a chamber therein showing a soil mixer, etc.; Fig. 3 a partial cross-section showing means for watering plants, Fig. 4 a diagram and partial section of a growing house showing apparatus for heating, watering, disinfecting and carrying on other operations; and Fig. 5 showing in cross-section another interior view of the growing house.

Agriculture as now carried on is not on a scientific basis, nor have the principles of engineering been applied to this vast industry. The phenomenon, which in electricity is called "hysteresis," that is the lagging of an effect behind its producing cause, has been entirely neglected in the treatment of social phenomena, and in a broad sense this is the explanation of many of society's problems so far unsolved, but which it is believed can be solved by the application of engineering science. For example, any method of economically storing and using the energy of sunlight must result in the immediate eradication of many social evils, among which is the present condition of the agricultural classes. The farmer at the present time is the slave of weather conditions which are really capable of complete control. He carries on a constant warfare against weeds and plant diseases, both of which may be easily eliminated. He must adapt himself to the climate in which his land is located, whereas he might easily control his climate. The character of his crops and the time of their production can also be directly controlled, and finally the present great waste of solar energy can be largely avoided. All this by the simple expedients of concentrating the acreage, housing the plants, sterilizing the soil, controlling the production and character of plants by changing light and temperature conditions, etc., as herein set forth.

The invention proposes a radical change in the entire method of producing food stuffs, as now practised. For illustration I show in the drawing, a growing house 1, which may be constructed of steel and wire glass supplemented by concrete, the glass being plain or in the form of prisms according to situation with respect to the sun's position. The roofs 2 are preferably formed of wire glass and prism glass where I desire to use a larger portion of the space for holding plant trays, in which case the prism glass performs the function of throwing light in particular directions to convey it to different parts of the building. I also use reflectors for the purpose of further distributing the light, as will be apparent without further description. The sides 3 and 4 are also preferably formed of prism glass for the same reasons.

Within the house 1, I provide a series of horizontal tracks 5 for shifting the position of plant trays 7 mounted thereon, while by the use of elevators 6, the plant trays may be shifted vertically, these latter are preferably formed of thin galvanized pressed steel and covered with reflecting material such as tin on the bottoms and outsides, in order to direct the light on to the plants as desired. The trays are best made of just sufficient depth for the most favorable growth of the particular plant to be grown therein, and they are mounted on wheels for easy shifting.

In one chamber of the growing house, as shown at the left of Fig. 1, and more in detail in Fig. 2, I provide a soil distributing machine, in which 8 represents hoppers, 9 a mixer, and 10 a sieve, all located so that the plant trays 7 may be brought beneath and filled with soil. The soil may conveniently contain calcine sand, lime and fertilizer. The soil may be completely sterilized so as to entirely eliminate the possibility of weeds, the seed being obtained in a pure state, it will thus be impossible for weeds to develop, and an immense part of the labor of farming is thus avoided. The growing house may also contain any convenient form of seeding mechanism, as here represented by the hopper 13 in Fig. 1. It may also contain a reaper, such as the mowing machine represented at 42 in Fig. 1.

In the growing house the plant trays are arranged in tiers as shown, and at suitable inclination to the plane of the earth's ecliptic, so that the maximum amount of light may be received and distributed to the different trays as required, it being understood that as the season changes the position of the trays will be changed. The growing house being entirely inclosed, not only prevents the entry of weed seed, and contamination by mold and fungi from outside, but enables the complete control of the temperature conditions, and the provision of what might be called an artificial climate. Some plants require different temperatures from others, some grow faster than others. I therefore divide up the growing house into compartments, as by the heat insulating shutters shown at 16, and by use of pipe 17 shown in Fig. 4 provide for the cooling of any desired compartment, or by use of pipes 18 to heat any desired compartment. Also I provide, and preferably underground, as shown in Fig. 1, a cooling or chill room by which to retard the development of particular plants when it is desired to delay their maturing. Thus they may be held in condition to supply the market at the right time. Of course, this chamber also is provided with cooling pipes as at 17 in Fig. 4.

In case mold or fungi or any plant disease invades the growing house, there is provided as shown in Fig. 4 a reservoir 14 containing gases or vapors fatal to the particular plant disease and these are distributed in the chambers as by pipes 15, at the place desired. I also provide, as shown in Fig. 3 a system of pipes for distributing water, or fertilizing fluid, or disinfecting sprays as desired, the main pipe 20 having perforated branch pipes 21 located over the plant trays. A convenient form of elevator for shifting the plant trays is shown in Fig. 5, it being understood that the lifting devices 23 are driven by suitable mechanism and carry supports 24 for the trays 23. I may also provide a horizontally moving belt 25 for shifting the trays laterally.

As shown at 43, in Fig. 1, I provide a breeding place for insects for carrying the pollen of the plants, these being provided in the separate compartments where needed and thus being under control.

In Fig. 4, I illustrate in diagram the power plant for use with the growing house. For example, I may provide a still 26, 27 for making alcohol from the plant products, it being stored in reservoir 29 by pump 28, and may use a vaporizer 29' supplying vapor to an engine 30 or to Welsbach lamps 31, while I may also thus operate a dynamo 32 furnishing current for fixing nitrogen of the air in suitable apparatus 33, preferably carbonid, or for producing light as in a mercury vapor lamp 34, or for any other necessary purpose, it being understood that the lamps may be used for forcing the growth by night or in dark weather.

The engine 30 may also drive a refrigerating compressor 35, whereby air cooled in the expansion apparatus 36 may be forced into cooling pipe 17, to control the temperature of any desired compartment; likewise the pump 37 may provide hot water for heating pipes 18. The exhaust gases from the alcohol engine 30, after passing through a scrubber 38 and three-way valve 39, may either be exhausted in the air at 40 or by pipes 15 distributed into the compartments for furnishing the plants with atmosphere richer in carbonic acid gas. It will be understood that I may also provide the necessary power for running the plant by means of apparatus operating direct from the sun's heat, and the power stored until needed by any convenient means, such as shown in my copending application No. 481973 of March 8th, 1909, for example. One of the most efficient ways of storing energy is by producing starch and making alcohol for use as a motive power.

It will be noted that by the means described, all the conditions under which plants are grown are under complete control. Thus there can be a system of intensive farming, by which a great variety of plants can be grown in any locality, and the time of their maturity governed to suit the condition of the markets. Also the plants may be developed by selection in a great variety of ways, as by increasing their effectiveness as starch producers, as growing wheat with a small stalk, developing low and regular cotton plants, etc., and such development can be made very rapidly. Manifestly, there may be many times the effective area provided for plant growing, and this concentration of acreage will enable the farmer to live close to the cities where his products are marketed, and besides other advantages market his goods fresh and on short notice and at the time when most needed, to say nothing of the saving in transportation from distant and isolated places as is at present the method. When the demand for any product slackens the agricultural engineer can retard the growth of his plants and when demands increase he can very quickly accelerate the growth of any particular plant. The initial cost of the growing houses is more than off-set by the multiplication of acreage and the elimination of waste and labor. Moreover, while at present most crops utilize a very small fraction of the solar energy received, by my invention the solar energy is so distributed as to utilize it all. Meantime, there is no loss from drouths and cold waves or wet seasons, or plant disease, agencies which now at times entirely ruin whole districts of the country and vitally affect the prosperity of an entire nation. Undoubtedly many plants now harmful or useless, may by selective development be put to use, when the conditions of growth may thus be completely controlled.

Having thus described my invention and illustrated its use, what I claim is:

1. An agricultural engineering system comprising a plurality of compartments and means to separately control the light intensity and heat conditions in said compartments including both refrigerating and heating means.

2. An agricultural engineering system comprising a growing house having a retarding compartment and mechanical means for transferring plants to and from such compartment.

3. A growing house divided into compartments including an underground compartment, and means for transferring plants from one compartment to the other and for controlling temperature conditions separately in separate compartments.

4. In a system of agricultural engineering, the combination of movable plant trays, a growing house and a retardation house and means for transferring the plant trays from the growing house to the retardation house and vice versa.

5. A structure of the character described divided into an upper growing compartment exposed to the light of the sun, and a lower retardation compartment closed to the light of the sun, and means communicating between the two compartments for mechanically transferring plants from one compartment to the other, substantially as described.

Signed at Brant Rock, in the county of Plymouth and State of Mass. this 4th day of October, A. D. 1906.

REGINALD A. FESSENDEN.

Witnesses:
JESSIE E. BENT,
ADELINE WOLMER.